UNITED STATES PATENT OFFICE.

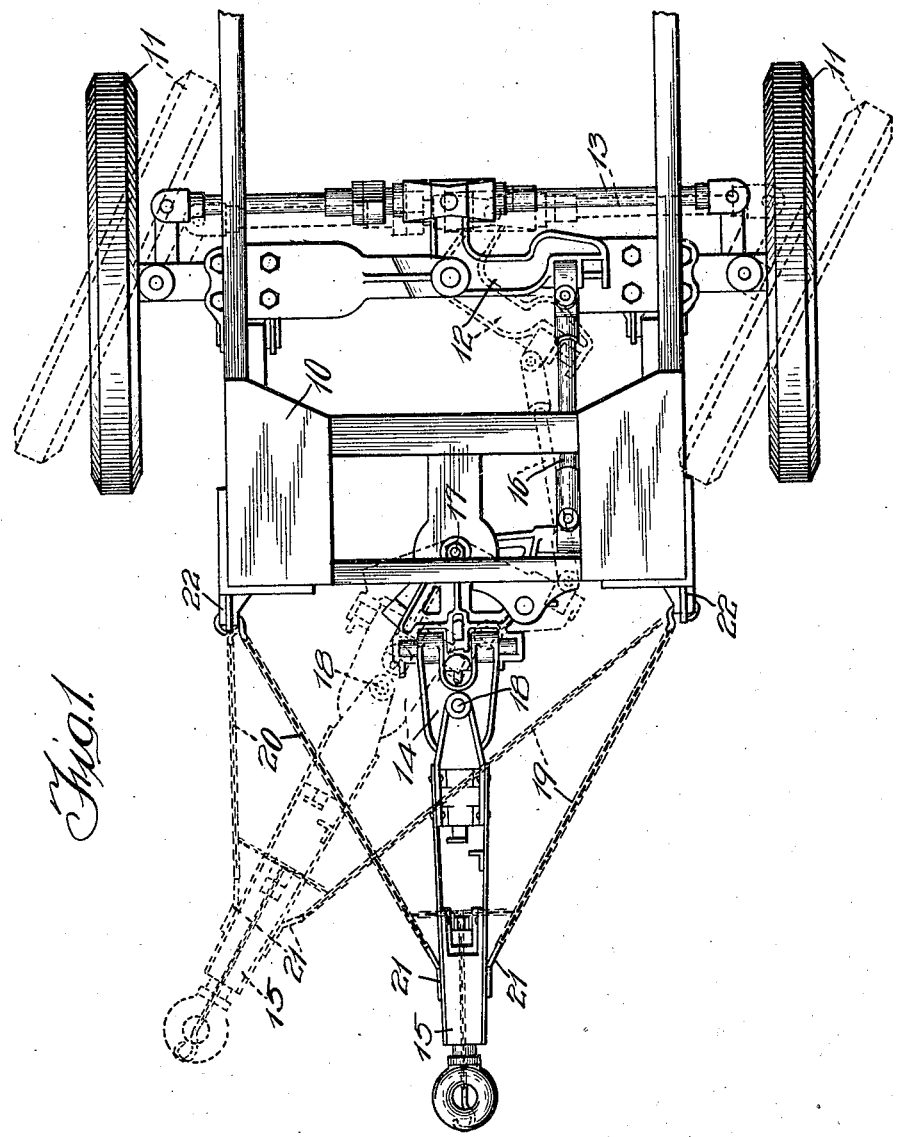

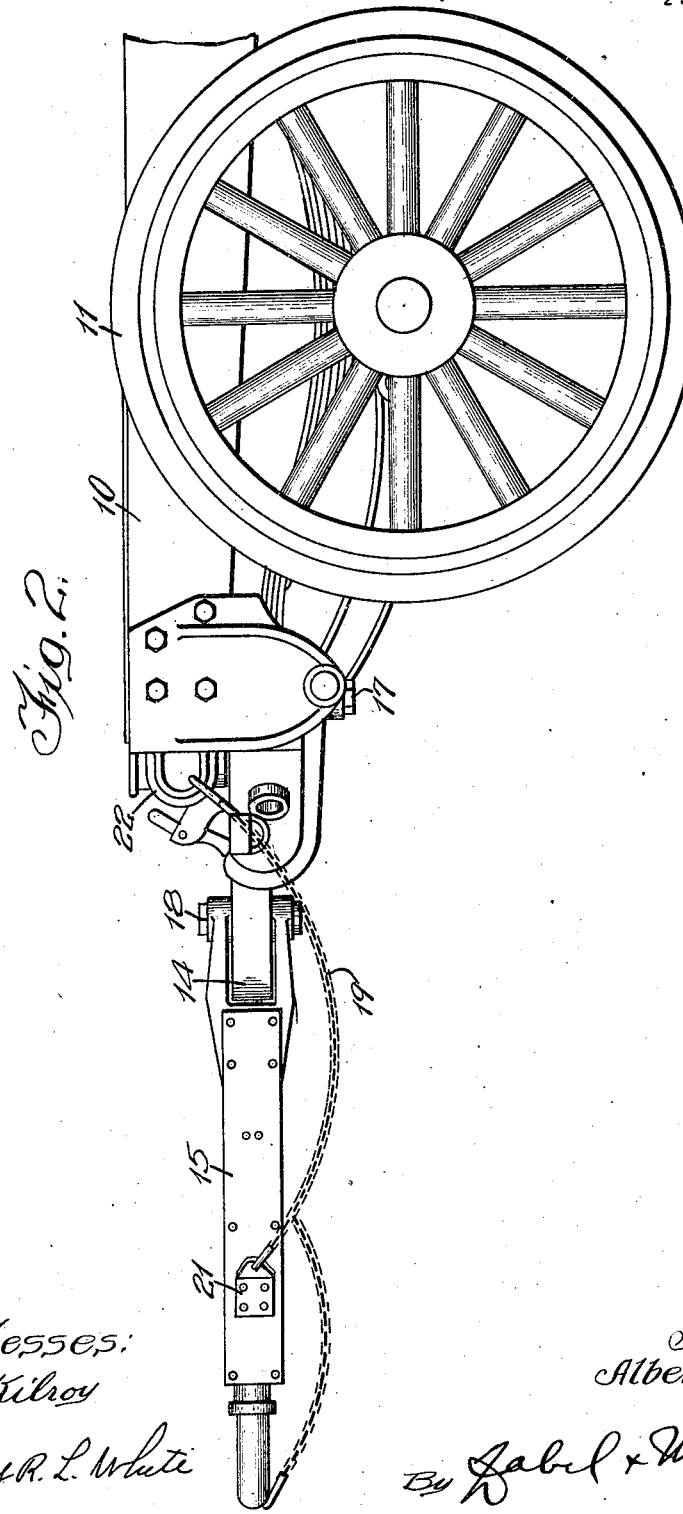

ALBERT P. LEE, OF CHICAGO, ILLINOIS, ASSIGNOR TO LEE TRAILER & BODY COMPANY, OF CHICAGO, ILLINOIS.

DRAWBAR MECHANISM.

1,390,451. Specification of Letters Patent. Patented Sept. 13, 1921.

Application filed June 23, 1919. Serial No. 306,201.

*To all whom it may concern:*

Be it known that I, ALBERT P. LEE, a citizen of the United States, residing at Chicago, in the county of Cook and State of Illinois, have invented a certain new and useful Improvement in Drawbar Mechanism, of which the following is a full, clear, concise, and exact description, reference being had to the accompanying drawings, forming a part of this specification.

My invention relates to draw bar mechanism for vehicles and more particularly for those vehicles used as trailers, and has for its object the provision of suitable means for taking care of exceptional conditions of steering which cannot be contemplated by the ordinary steering mechanism.

In my application Serial No. 289,490, filed April 12, 1919, I show in general a draw bar mechanism similar to that disclosed in the present application and which is used for illustrative purposes herein as one sort of draw bar mechanism which works well in connection with my improved means.

On a four wheel trailer it is not only desirable but necessary to have a safety chain between the trailer and the motor truck. The reason for this is that the draw bar of the trailer may become disengaged from the truck pintle hook or may break, in which case if there was no safety chain the trailer would run wild and might do a great deal of damage, especially in crowded streets or on city thoroughfares.

The safety chains which have generally been used for this purpose did not provide means for steering the trailer provided the draw bar became disengaged or was broken. With my design of safety chain provision is made for steering the trailer if any of the parts become broken or disengaged. My safety chain also provides against cramping of the axle.

In order to get the best results from a four wheel reversible trailer it is necessary to get the full turning radius of the axle. This makes it possible to build a trailer of longer wheel base which will turn around in a smaller circle, whereas a trailer so constructed as to not be able to get the full turning value of the axle must be built of a shorter wheel base. It is obvious that a tremendous power is applied to the outer end of the draw bar of a trailer when attached to a large motor truck and it is possible to so turn the truck as to exert this full power on the end of this draw bar and cramp the steering mechanism together with the axle. It is therefore a different matter to provide sufficiently strong stops either on the axle or on the steering mechanism to prevent the breaking of the steering mechanism or of the axle. This safety chain which is of great strength and which is permanently attached to the outer end of the draw bar is also attached to the two front corners of the trailer. This makes it impossible to cramp the steering mechanism or the axle itself in any way.

I will explain one form which my invention may take more in detail by referring to the accompanying drawings, illustrating the same, in which—

Figure 1 is a top view of the front portion of a trailer framework showing my improved means; and Fig. 2 is a side view thereof.

Referring more particularly to Fig. 1, I show a trailer framework 10 having the front wheels 11, 11, which are suitably mounted so that they may be steered, which steering is accomplished through the agency of the bell crank lever 12 and tie rod 13 suitably controlled through intermediate mechanism by the draw bar head 14. The draw bar head 14 has a draw bar 15 pivotally connected therewith in such manner that it may be locked in position or permitted to pivot relatively to the head 14, all as clearly set forth in my said copending application. The draw bar head is connected through the agency of a link structure 16 to the bell crank lever 12, there being suitable universal joint mechanism interposed between the link and its points of connection with the draw bar head 14 and bell crank lever 12 respectively. The draw bar head 14 has suitable means made in accordance with the structure disclosed in my said co-pending application whereby it may pivot normally about the axis 17 in order to steer the front wheels 11, 11; and may be at other times locked against rotation as when the trailer is being backed, under which condition of things the draw bar 15 is usually permitted to swing freely upon its axis 18. The structure is such that the draw bar 15 when steering the front wheels may swing only a limited amount by reason of the fact that the wheels would otherwise touch the framework of the trailer and the extreme limit of movement is shown by the dotted illustration of the draw bar in Fig. 1.

Very frequently in the operation of trailers it happens that the pulling vehicle would, if the limit of movement of the draw bar were sufficient, pivot the draw bar beyond the dotted position. As this, however, cannot be performed, by reason of the limitations specified, additional means must be provided so that the draw bar at the limit of its stroke has a reinforcing connection with the framework of the trailer so that the pulling vehicle if it tends to pivot the draw bar beyond the dotted position, will, instead of breaking some of the parts, slide the whole framework of the trailer either to the right or to the left as the case may be until the draw bar 15 again is coincident with the line joining the application of the forces between the pulling vehicle and the trailer. If no means were provided to accommodate for this side play, which tends to bend the draw bar beyond the position shown in dotted lines, then some of the parts of the draw bar head or mechanism by reason of the great curvature would break. It is thus necessary to apply means which may connect the extremity of the draw bar with a point of the vehicle sidewardly of its center line so that breakage of the parts is avoided.

The simplest form of a structure would be the provision of chains 19 and 20 such as are shown in the illustrations, these chains being attached respectively to the draw bar at the points 21, 21 and to the vehicle at the eyes 22, 22. These chains are so arranged that they will be taut whenever the draw bar 15 has moved into its predetermined limiting position. Under such a state of operation if the pulling vehicle still exerts a force tending to pivot the draw bar about its axis 17, such force will be applied to the entire trailer through the taut chain 19, whereupon the entire trailer will be slid over into alinement without consequent breakage of some of the steering or draw bar mechanism.

From what has been thus described the nature of my invention will be readily clear to those skilled in the art and it will also be apparent that many modifications may be made within the scope of the appended claims without departing from its spirit.

What I claim as new and desire to secure by Letters Patent is:

1. A trailer of the character described having a framework, wheels therefor, means including a draw bar associated with said framework for steering said wheels, said draw bar having a predetermined radius of action, and flexible tension means operable when said draw bar is at the limit of its stroke for transferring the force of additional sidewise pull between a portion of said steering mechanism forwardly of its pivotal point and a portion of the framework sidewardly of the pivotal point of said steering mechanism.

2. A trailer of the character described having a framework, wheels therefor, means including a draw bar associated at one end thereof with said framework for steering said wheels, said draw bar having a predetermined radius of action, and tension means operable when said draw bar is at the limit of its stroke on either side of its central position for transferring the force of additional sidewise pull between a portion of said steering mechanism free of said framework and forwardly of its pivotal point and a portion of the framework sidewardly of the pivotal point of said steering mechanism.

3. A trailer of the character described having a framework, wheels therefor, a draw bar having one end pivotally mounted upon the end of said framework, said draw bar extending outwardly from said framework beyond its pivotal point and having a predetermined radius of action, and chains connected to said draw bar near its outer end, said chains serving to transmit the force of additional sidewise pull from said point of connection on said draw bar to a portion of said framework laterally of said pivotal point, to relieve the strain on said draw bar and pull said framework sidewise.

In witness whereof I hereunto subscribe my name this 12th day of June, A. D. 1919.

ALBERT P. LEE.